(12) United States Patent
Vicik et al.

(10) Patent No.: US 7,244,481 B2
(45) Date of Patent: Jul. 17, 2007

(54) NYLON FOOD CASING HAVING A BARRIER CORE LAYER

(75) Inventors: Stephen J. Vicik, Darien, IL (US); Amy L. Glawe, Downers Grove, IL (US)

(73) Assignee: Viskase Companies, Inc., Darien, IL (US)

( * ) Notice: Subject to any disclaimer, the term of this patent is extended or adjusted under 35 U.S.C. 154(b) by 739 days.

(21) Appl. No.: 10/142,160

(22) Filed: May 10, 2002

(65) Prior Publication Data

US 2003/0008084 A1    Jan. 9, 2003

Related U.S. Application Data

(60) Provisional application No. 60/299,086, filed on Jun. 18, 2001.

(51) Int. Cl.
*B32B 1/08* (2006.01)

(52) U.S. Cl. ............... 428/34.8; 428/34.9; 428/35.1; 426/105; 426/106; 426/127; 426/129

(58) Field of Classification Search ............ 428/34.9, 428/35.1, 35.8, 34.8; 426/105, 106, 127, 426/129
See application file for complete search history.

(56) References Cited

U.S. PATENT DOCUMENTS

| | | | |
|---|---|---|---|
| 3,278,663 A | 10/1966 | Graham | 264/95 |
| 3,337,665 A | 8/1967 | Underwood et al. | 264/95 |
| 3,456,044 A | 7/1969 | Pahlke | |
| 4,303,711 A | 12/1981 | Erk et al. | 428/36 |
| 4,560,520 A | 12/1985 | Erk et al. | 264/22 |
| 4,590,106 A | 5/1986 | Hsu et al. | 428/35 |
| 4,760,116 A | 7/1988 | Roberts | 525/221 |
| 4,769,421 A | 9/1988 | Hwo | 525/240 |
| 4,797,235 A | 1/1989 | Garland et al. | 264/22 |
| 4,855,183 A | 8/1989 | Oberle | 428/345 |
| 4,886,634 A | 12/1989 | Strutzel et al. | 264/560 |
| 4,888,223 A | 12/1989 | Sugimoto et al. | 428/34.9 |
| 4,892,765 A | 1/1990 | Hisazumi et al. | 428/34.8 |
| 5,185,189 A | 2/1993 | Stenger et al. | 428/34.8 |
| 5,328,705 A * | 7/1994 | Wilhoit et al. | 426/113 |
| 5,344,679 A * | 9/1994 | Vicik | 428/36.91 |
| 5,612,104 A * | 3/1997 | Grund | 428/34.8 |
| 5,698,279 A | 12/1997 | Vicik | 428/34.8 |
| 5,747,124 A | 5/1998 | Pophusen et al. | 428/34.8 |
| 5,843,502 A * | 12/1998 | Ramesh | 426/127 |
| 5,985,386 A | 11/1999 | von Widdern et al. | 428/34.8 |
| 6,194,040 B1 | 2/2001 | Delius et al. | 426/34.8 |

FOREIGN PATENT DOCUMENTS

| | | | |
|---|---|---|---|
| EP | 0216094 | * | 4/1987 |
| EP | 0432611 A | | 6/1991 |
| EP | 0974452 A | | 1/2000 |
| EP | 0986957 A | | 3/2000 |
| KR | 1 172202 A | | 1/2002 |

* cited by examiner

*Primary Examiner*—Harold Pyon
*Assistant Examiner*—Marc Patterson
(74) *Attorney, Agent, or Firm*—D. Bobrowicz

(57) ABSTRACT

Tubular, biaxially stretched, heat shrinkable multilayer film food casings comprising inner and outer polyamide layers on either side of a core layer of EVOH surrounded by an inner and outer adhesive layer, and a coextrusion process for making the film.

8 Claims, No Drawings

NYLON FOOD CASING HAVING A BARRIER CORE LAYER

BACKGROUND OF THE INVENTION

This application claims the benefit of U.S. Provisional Application Ser. No. 60/299,086 filed Jun. 18, 2001.

The present invention relates to oriented nylon casings, particularly food casings suitable for making sausage, ham in mold products, and D-shaped products.

Tubular films are used as sausage casings for processing and packaging cooked foods including water or steam cooked sausages, such as liver sausage and fleischwurst, hams processed in molds, and "D" shaped foods such as turkey breasts with one flat side.

The selection of films for packaging food products includes consideration of a number of criteria such as cost, abrasion resistance, wrinkle resistance, meat adhesion, dimensional uniformity and stability, stiffness, strength, printability, durability, oxygen and water barrier properties, stretchability, machinability, optical properties such as haze, gloss, and freedom from streaks and gels, and safety for contact with food.

In general, commercial sausage making operations for making water cooked or steam cooked sausages require casings made from materials able to perform well in the following typical process steps:
1. Stuffing with meat emulsion to a uniform diameter;
2. Clipping or otherwise sealing the casing about its circumference to form discrete logs;
3. Cooking the encased sausage to temperatures of at least 65–100° C.;
4. Chilling the cooked encased sausages to 4° C. or less;
5. Optionally cutting the logs into discrete lengths or slices; and
6. Repackaging cut logs or slices by vacuum packaging.

Sausages so made must be uniform in size and must be wrinkle free.

Other uses for casings include processing hams-in-mold and meat products such as turkey breasts or loaf products. Hams processed in molds are processed by encasing a ham or a portion of one in a casing, cutting the casing to form a loose package around the ham, clipping or sealing the casing end, placing the ham into a mold, squeezing it and closing the lid, cooking the ham in the mold, and releasing it from the mold and ultimately removing the casing. After cooking, ham in mold products must have square corners and must be of certain dimensions to fit into vacuum sealed cans that are sold to the final customer.

"D" shaped foods are similarly processed as in ham in mold, except that once the turkey meat, for example, is encased, it is placed on a tray and then further heat processed. The bottom edge is flattened, giving the processed turkey a "D" shape, thereby imitating the shape of a bone-in turkey breast. A product having a more oval shape, the manufacturer would consider the product unacceptable. A similar situation exists for loaf shaped products, which may later be sliced as deli meats. These products must not become rounded during processing, but rather must retain the desired D or loaf shape.

The various required shapes and wrinkle-free features of the finished products are provided by the use of the correct type of casing.

Various monolayer and multilayer casings have been proposed and used commercially to make processed foods. Moisture barrier properties are important to prevent loss of water during and after cooking. Desirably, these casings will also have low oxygen permeability to avoid discoloration, adverse flavor changes, and oxidation of the food stuff during storage. Liver sausage in particular is easily susceptible to defects when contacted with excessive oxygen, resulting in discoloration, Furthermore, it is highly desirable to produce an encased cooked food stuff that exhibits a tight fitting casing having few or no wrinkles even after prolonged storage. There should be a minimum of spaces or pockets between the food mass and the inside of the casing since such spaces or pockets promote separation and collection of fats, liquid and gelatinous materials in such spaces which leads to a non-uniform meat or sausage appearance that is unappetizing and undesirable to consumers.

Cellulose casings of, e.g., fiber reinforced regenerated cellulose coated with moisture barrier coatings such as a polyvinylidene chloride copolymer ("PVDC"), e.g., saran, have been commercialized, as have monolayer casings made of PVDC. These casings have excellent oxygen and moisture barrier properties.

Also, commercially available coated cellulosic casings have excellent dimensional uniformity and stability, but are expensive to produce compared to plastic casings. However, use of PVDC has raised environmental concerns due to the difficulties of recycling chlorinated polymers and possible release of chlorinated by-products during incineration. Furthermore, the dimensional stability and uniformity of saran monolayer casings are generally inferior to the cellulosic casings, as saran monolayer casings after cooking and chilling tend to relax, thereby causing a wrinkled appearance.

To ameliorate the aforementioned problems and costs associated with coated cellulosic casings, several polyamide casings have been introduced into the market. Both monolayer and multilayer polyamide casings have been commercialized and both non-shrinkable and shrinkable casings have been made by blown film and oriented film processes.

As discussed in U.S. Pat. No. 4,303,711, "single-layer, unstretched plastic casings consisting of higher homopolyamides (polyamide 11 and polyamide 12)" are known as well as plastic casings consisting of such polyamides coextruded in two layers with polyamide 6 as the outer layer. These polyamide casings may be easily made by the blown film technique, but typically suffer from a lack of dimensional stability and uniformity, being deformed upon stuffing so that production of stuffed sausages to a uniform diameter is difficult. The '711 patent further indicates that these unstretched films suffer from an undesirably wrinkled appearance after cooking and chilling.

Various attempts have been made at making stretch oriented polyamide casings. Uniaxially stretched casings which are only stretched in the longitudinal (machine) direction ("MD") reportedly have the same disadvantages as unstretched casings regarding insufficient dimensional stability, nonuniformity of diameter and excessive wrinkling.

U.S. Pat. No. 4,560,520 (Erk et al.) discloses forming multiaxially stretched, monolayer, polyamide, tubular films, e.g., of nylon 6 or nylon 66 which have elastic properties and which are said to be used for packaging table sausages and boiled sausages. The disclosed films are "fixed thermally" and shrunk after stretching, e.g., by subjecting the tube to controlled shrinkage of at least 15% and at most 40% at temperatures above 90° C. and also subjecting the film to infrared irradiation. This is to produce a nylon casing which does not have shrinkage at temperatures under 90° C. This pre-shrunk casing is used for stuffing with meat emulsion and relies upon its elastic properties to provide wrinkle resistance.

This patent goes on to refer to a "shrinkable multiaxially stretched thermally fixed sausage casing of polyamide", which remains close fitting but suffers from insufficient resistance to tearing. The assignee of this patent, Naturin-Werk Becker & Company has commercialized several monolayer nylon casings under the trademarks Optan, Betan and Tripan.

Nylon monolayer casings whether made by the blown film process or the stretch oriented film process are disadvantageously sensitive to moisture. As noted above, it is desirable for casings used to package fleischwurst and liver sausage-type products to have low permeability to steam or water. Also, moisture is known to adversely affect the oxygen barrier properties of many nylons causing an undesirable increase in oxygen transmission rates when wet. In view of these disadvantages, attempts have been made to utilize blends of nylon with other materials to enhance properties such as gas and water vapor impermeability. For example, U.S. Pat. No. 4,303,711 discloses a plastic casing made from a mixture of polyamide and ionomer. Also, the company Hoechst AG has commercialized what are believed to be monolayer casings containing blends of polyamide and polyester.

Furthermore, attempts have been made to use nylon in biaxially stretched multilayer casing to overcome these disadvantages. For example, U.S. Pat. No. 4,888,223 discloses 2 to 5 layer heat shrinkable tubular structures all having polyamide in either the outer layer or core layer and having a polyolefin inner layer that is corona treated for meat adhesion.

Also, U.S. Pat. No. 4,855,183 discloses a multilayer tubular shrink film having a polyamide inner layer which is irradiated to promote meat adhesion and which has additional polyolefinic layers which may comprise materials such as EVA, EMA, EEA, LLDPE, VLDPE, LDPE, HDPE or MDPE.

Disadvantageously, the above '223 and '183 patents disclose structures that require a corona treatment or irradiation step to enhance meat adhesion thereby requiring additional equipment, processing time and/or cost.

U.S. Pat. No. 5,185,189, issued on Feb. 9, 1993 to Stenger, discloses a multilayer casing which may consist of a three layer coextruded and biaxially oriented tube which, if desired, may be "thermofixated". A structure having inner and outer polyamide layers separated by a middle layer of polyolefin, blended with or coated with an adhesion imparting component, is disclosed for use as a sausage casing with low permeability to steam and oxygen. The middle layer is preferably a polyolefin blended with an adhesion imparting component in a portion which in general is 5–50 weight % based on the polymer blend present in the middle layer. According to this document, the portion of the adhesion imparting component is preferably 10 to 35% by weight but "should be kept as low as possible". This adhesion component is viewed as being required to prevent layer separation during cooking in hot water. Useful adhesion imparting agents are disclosed as including polyolefin resin modified with functional groups such as vinyl acetate, acrylic acid and methacrylic acid, as well as their esters and salts, and furthermore, ethylenically unsaturated carboxylic anhydride groups. These casings are oriented by biaxial stretching. To improve dimensional stability after stretching, the casing is annealed to produce a material having a shrinkage of less than 20%, preferably less than 15% in both vertical and horizontal directions, at temperatures of up to 90° C. Elastic behavior and shrinkage during drying are relied upon to provide a purportedly tight wrinkle free fit.

Unfortunately, orientation of seamless tubes of nylon by biaxial stretching is difficult. Extrusion and orientation of multilayer tubes, especially coextruded tubes, containing mixed layers of polyamides and other materials having different melting points, melt viscosities, and a different affinity for water can be very difficult. For example, U.S. Pat. No. 4,892,765 (Hisazumni et al.) notes that although it is desirable to extrude films for packaging hams and sausages in tubular form, it is difficult to make a stretched tubular polyamide film of uniform thickness. This patent also notes that layer adhesion becomes weak when multilayer, polyamide films are stretched. Hisazumi et al. disclose production of a heat shrinkable multilayer film having a core layer of a PVDC attached to opposing polyamide layers (e.g., of nylon 6/66 copolymer) by opposing adhesive layers. This film is made using an orientation process which utilizes water to soften and plasticize the nylon to a degree sufficient to allow or facilitate orientation. The orientation processes employed for nylon multilayer casing have tended to involve complicated apparatus and processing such as that found in U.S. Pat. No. 4,886,634. Cook-in pouches developed by Viskase Corp. and known as "Cook-Tite" are made of layers arranged as polyolefin/adhesive/ethylene vinyl alcohol/adhesive/polyolefin. Raw meats are placed inside such pouches, sealed and then subjected to cooking.

U.S. Pat. No. 5,698,279, issued on Dec. 16, 1997 to Vicik, describes a multilayer tubular film comprising the structure of inner and outer layers of polyamide, with a core layer of a blend of EVA and another polyolefin such as ethylene methacrylic acid copolymer, providing casing with good oxygen barrier properties.

U.S. Pat. No. 5,747,124, issued on May 5, 1998 to Pophusen, describes a tubular film having at least four layers, where the inner and outer layers are polyamides, and the enclosed two layers are oxygen barrier layer, such as EVOH, and an polyolefin, having a quotient of tear resistance of TD/MD of less than or equal to 0.85.

U.S. Pat. No. 5,985,386, issued on Nov. 16, 1999 to von Widdem claims a multilayered, biaxially oriented tubular sausage casing made of a film of at least four layers where the inner and outer layers are a polyamide or blend of a number of polyamides and where at least either the inner or outer layer polyamide also is blended with another polyamide, copolyamide or polyolefin copolymer; and where there is a center water barrier layer of a variety of polyolefins; and another center layer of ethylene vinyl alcohol. In its examples, '386 also discloses a feature of this film whereby the inner polyamide layer(s) are thicker than the outer layer, which may at least partially account for the barrier features of this film. This provides for a casing that has oxygen and moisture barrier properties suitable for longer storage life for the encased sausages. No teaching is made of the use of this film to produce ham in mold or D shaped products.

U.S. Pat. No. 6,194,040 B1, issued on Feb. 27, 2001 to Delius et al., also describes a casing useful for longer term storage of encased sausage. A tubular, biaxially-oriented casing having four layers, where the outer layer is a mixture of two polyamides, a first intermediate layer is ethylene vinyl alcohol blended with a copolyamide, an olefinic polymer, or an ionomer, a second intermediate layer of an polyolefin, and an inner layer of an aliphatic polyamide.

In summary, although several of the aforementioned plastic casing products have gained varying degrees of commercial acceptance in different market segments, their advantage compared to the traditional cellulosic casing has been chiefly one of cost with the problems of dimensional stability, uniformity of diameter, and wrinkling being persistent concerns.

Prior art fiber reinforced cellulose casings coated with moisture barrier coatings perform well in processing water/steam cooked sausages such as fleischwurst and liver sausage. However, the high cost of manufacture of such casings has led casing manufacturers to search for less expensive alternatives. Thermoplastic films of various compositions have been suggested and some have found varying degrees of success in various segments of the market. Thermoplastic sheet film has been made into a tube by seaming, but this is a difficult process which produces a casing having a seamed area which may undesirably differ in appearance and performance relative to an unseamed casing.

Seamless tubular thermoplastic casings have been made which overcome the objections to seamed casings. Various materials have been employed, but materials containing chlorinated polymers have been objected to for environmental reasons among others. Seamless polyamide casings have been made of blown film, however these casings tend to have poor performance with respect to wrinkling, uniformity of diameter, and dimensional stability. Seamless biaxially oriented multilayer films have also been made, However such films have been difficult to produce, requiring special blend formulations and structures or complicated equipment and procedures.

Therefore, it is an object of the present invention to provide a multilayer, biaxially stretched, heat shrinkable, thermoplastic film useful as a casing for foodstuffs of both regular and irregular shapes, needing moisture and oxygen barriers during processing and afterward, such as sausages or ham in mold products, which includes among its desirable properties one or more, of the following:

a) sufficient flexibility and softness to facilitate shirring and subsequent stuffed log formation or irregular shapes by gathering of the casing and clipping to form the ends;

b) resistance to permanent deformation during stuffing, cooking and chilling, and maintenance of a symmetrical cylindrical shape, if needed, with a minimum of curvature or bulging;

c) an acceptable, to the final customer, level of change of height of the packaging between the preprocessed and the postprocessed products, when the products must have a final D shaped configuration.

d) an ability to adhere to both the regularly or irregularly shaped food during expansion and contraction of the food during cooking and chilling;

e) resistance to bursting or tearing during stuffing, when pressure is applied to force the encased foodstuff into a mold, during cooking at elevated temperatures, and during subsequent handling;

f) resistance to wrinkling during processing and handling;

g) little or no moisture loss during cooking and storage, i.e., high cooking yield;

h) resistance to passage of oxygen in order to prevent spoilage; and i) an ability to be cut or sliced easily without edge curling or splitting, and to be removed without damaging the surface of the foodstuff It is a further object of the present invention to provide a tubular film having a unique combination of shrink, mechanical strength and barrier properties suitable for use as a foodstuff casing, where the foodstuffs include both regularly shaped chubs and irregularly shaped foodstuffs such as meat parts.

It is a further object of the present invention to provide a polyamide sausage casing having a polyamide inner layer which adheres to meat without requiring addition of starch based additives or treatment with electron beam irradiation or corona discharge.

It is a further object of the present invention to provide a multilayer oriented structure having sufficient shrinkage values and shrink force values to provide good conformation of the casing to the filling after cooking, chilling and storage.

It is a further object of the present invention to provide an improved biaxially stretched, heat shrinkable polyamide multilayer casing, that in addition, can accept coloring in a discrete layer.

SUMMARY OF THE INVENTION

The foregoing objectives may be provided according to the present invention, in a novel tubular, biaxially stretched, heat shrinkable, multilayer film, food casing. This newly disclosed film has an inner layer comprising a polyamide; an outer layer comprising a copolyamide; a core layer comprising ethylene vinyl alcohol copolymer ("EVOH"); and an inner and outer adhesive layer placed on either side of the core layer comprising a linear low density polyethylene ("LLDPE") alone or blended with ethylene vinyl acetate polymer ("EVA"). The inner polyamide layer must be thinner than the outer polyamide layer. The multilayer film has a shrinkage value of from about 15% to about 20% in both the machine and transverse directions ("MD" and "TD") at 90° C. These inventive films are surprisingly easy to process and orient and have excellent optical properties. They are capable of being shirred and used as casings, for both regularly shaped sausages and irregularly shaped meat products, with fewer wrinkles than many commercialized prior art nylon casings. They do not require "after shrinking"; the layers adhere well to one another without delamination and have excellent dimensional stability, uniformity of diameter and appearance. Additionally, it has been found that attractively colored casing are produced by adding coloring agents to the outer adhesive layer, which is then layered over with the glossy nylon outer layer.

Surprisingly, the present invention provides a relatively simple process and multilayer film which achieves a high degree of performance in providing a dimensionally stable film of uniform diameter which is suitable for shirring, stuffing, cooking and general manufacture of both sausages and irregularly shaped meats, such as in ham in mold and "D" shaped food products, and a tight wrinkle-free appearance without requiring an after shrinking step.

Advantageously, the melt plasticized, coextruded, thermoplastic tube will have a polyamide exterior surface and interior surface, of preferably nylon 6/66 copolymer as the outer layer, and nylon 6 as the inner layer, with both the interior and exterior surface layers adhered to the core layer of EVOH (preferentially having from about 38 to about 44 mole % ethylene) by an inner and outer adhesive layer of a LLDPE, such as maleic anhydride grafted LLDPE, or a LLDPE blended with EVA. The interior surface layer will have a thickness that is less than that of the exterior surface layer.

DETAILED DESCRIPTION OF THE INVENTION

The invention in all of its embodiments comprises or utilizes a heat shrinkable, biaxially stretched, multilayer, thermoplastic, polymeric flexible film. This film has a thickness of about 40 to about 60 microns. This film provides a beneficial combination of properties including ease of shirring and stuffing with low cost, good mechanical strength, good adhesion, and good oxygen and water barrier properties.

The inventive article is a heat shrinkable, multilayer film having at least five layers. These essential layers are an inner and an outer layer consisting of aliphatic polyamide or copolyamide, two adhesive and moisture barrier layers—the inner and outer adhesive layers—immediately adjacent to each polyamide layer, and adjacent to a core layer of EVOH. Tubular films having more than these five layers may be constructed and such layers may be disposed as intermediate layers lying between the core layer and either or both of the inner and outer adhesive layers, or the inner and outer layers and the inner and outer adhesive layers, or these additional layers may comprise one or more surface layers and comprise either or both the interior or exterior surface of the tube. Preferably, the polyamide inner layer will comprise the interior surface layer of the tube where in use it will contact a foodstuff encased by the tube, and it will be thinner than the outer layer.

The thicknesses of each layer of this film are: from about 8 to about 15 weight % inner layer; from about 15 to about 20 weight % inner adhesive layer; from about 3 to about 5 weight % core layer; from about 15 to about 20 weight % outer adhesive layer; and from about 43 to about 55 wt. % outer layer. Films with differing layer ratio thicknesses are possible, while retaining the advantages of this film. However, it is believed that the relatively thin inner layer, the thicker adhesive layers and the thick outer layer are present in a combination not described before, and are essential to providing the characteristics of the present invention.

The function of the inner layer is primarily to provide an adhering surface for contact with the food stuff, typically being sausage meat. In the present invention, to fulfill this function, a thin inner layer is preferred for ease of processing. It is important that this inner layer be continuous over the inner surface of the tube and that it be extruded at a sufficient thickness to allow the desired degree of stretching without forming discontinuities in coverage. The inner layer of the present invention also provides good machinability and facilitates passage of the casing over shirring mandrels or stuffing horns without the necessity for addition of antiblock additives, polymeric plasticizers, or slip agents to the interior surface layer of the film.

The outer layer provides mechanical strength and acts as a gas barrier, particularly for oxygen. This outer layer is typically the thickest to provide support and impart strength to the casing wall in order to withstand stuffing, cooking, and handling pressures and abrasion.

In the present invention, the inner and outer layers comprise polyamides, the inner and outer adhesive layers comprise LLDPE's such as a maleic anhydride grafted LLDPE, or a blend of LLDPE and EVA, and the core layer comprises an oxygen barrier of EVOH. The multilayer film has a shrinkage measured at 90° C. of at least 15% to about 20% in both machine and transverse directions. By utilizing a multilayer film, the present invention overcomes disadvantages in monolayer polyamide casings of the prior art that sacrifice one or more desired functions such as moisture or gas impermeability, dimensional stability, uniformity of diameter, wrinkle resistance or meat adhesion for other functions including those listed above as well as processability or ease of manufacture.

Polyamides are polymers having recurring amide (—CONH—) linking units in the molecular chain. Polyamides include nylon resins which are well known polymers having a multitude of uses including utility as packaging films, bags and casing. See, e.g., *Modern Plastics Encyclopedia*, 88 Vol. 64, No. 10A, pp. 34–37 and 554–555 (McGraw-Hill, Inc., 1987), which is hereby incorporated by reference. In particular, the novel thermoplastic flexible oriented multilayer films of the present invention are useful in food packaging. "Nylon" is a generic term for synthetic, high molecular weight (MW 10,000) linear polyamides. Suitable nylons are commercially available and may be prepared by well known methods including addition or self-condensation reactions, e.g., of amino acids or lactams and condensation reactions of diamines with diacids. Nylon polymers may be aliphatic or aromatic. Suitable nylon polymers may be homopolymers or copolymers such as bipolymers and terpolymers, and blends and modifications thereof.

Suitable nylons for use in either or both of the inner and outer polyamide layers are believed to include nylon 6, nylon 6/12 copolymer, and nylon 6/66 copolymer. Preferred polyamides are aliphatic nylons such as nylon 6, and copolymers thereof and especially preferred are aliphatic nylon copolymers such as nylon 6/66. Advantageously, the inner layer may comprise nylon 6 and the outer layer may comprise the copolyamide nylon 6/66, which exhibits highly desirable properties of oxygen impermeability, mechanical strength, and ease of stretch orientation.

The inner layer preferably is the interior surface layer of the tubular article and beneficially the composition of this layer will have the characteristic of adhering to meat. Preferably, the composition of the inner layer will allow for the inner layer's coextrusion as part of a multilayer film without detrimental delamination from any adjacent polymeric film layer during such operations as annealing, reeling, shirring, stuffing, cooking, refrigerating, and subsequent use. A further function of this inner layer is that it should not block when the tube is collapsed upon itself, and should facilitate opening of the tube and passage thereof over equipment such as shirring mandrels and stuffing horns. Advantageously, the present invention utilizes a polyamide which does not require internally applied antiblock coatings.

The thick outer layer comprises a copolyamide, preferably nylon 6,66. It is desirable that the outer layer be protected by the core layer from excessive moisture migration from encased foodstuffs which may impair the oxygen impermeability of the polyamide outer layer. Thus, in the inventive casing the polyamide outer layer functions as an oxygen barrier and provides in combination with the other layers a casing with a sufficiently low oxygen transmission rate to prevent or substantially delay oxidative defects such as discoloration of the encased sausage meat. It has been found that suitable nylons will have a relative viscosity ($\eta_r$) in 98% sulfuric acid of greater than about $4\eta_r$. Polyamides having relative viscosity values below 4 have an undesirably low melt viscosity for this invention that makes it more difficult to be extruded and oriented as tubes. Although it is not necessary for the present invention, additional processing aids, colorants, antiblock agents or adhesive components may be added to either or both of the inner and outer layers.

The films of the present invention are biaxially stretched and oriented films. An important feature of the present invention is that the inventive films have sufficient shrinkage values and shrink forces to produce smooth wrinkle resistant casings able to closely conform to encased foodstuffs, no matter their shape, during heat processing, chilling, refrigeration and storage.

The relatively thick inner and outer adhesive layers function not only as an adhesive between the core and the inner or outer layer, but also as a water vapor barrier, and provide the film with the suppleness and proper modulus for good shirrability and orientation. The adhesive layers are composed of polyolefin resins modified with functional groups. The resins are composed of units of ethylene known as LLDPE. These are copolymers of ethylene and alpha-olefins, and have densities from 0.915 to 0.940 g/cm$^3$. In particular, graft polymers of LLDPE are used, such as a maleic anhydride grafted LLDPE. Blends of LLDPE's and EVA may also be used. For example, adhesive concentrates such as Bynel 4140, sold by E.I. DuPont de Nemours and Company, when blended with a fractional melt index EVA may also be used. Advantageously, ethylenic polymeric units are nonpolar and hydrophobic, imparting moisture barrier properties to the core layer. It is also in the outer adhesive layer that additional agents, such as coloring agents, may be added prior to extrusion, making a colored tubing.

The core layer is an EVOH copolymer, and can be any derived EVOH polymer, and preferably consists of about 38 to about 44 mole % ethylene units. The preferred EVOH, which includes lubricants and is in a stabilized formula, is sold under the trade name "Eval H101BD" by Eval Company of America. Such lubricants and stabilizers are included in minimal amounts. EVOH is well known as being an oxygen barrier, even as a very thin layer in a multilayer film, but it is also known as a material difficult to stretch and orient. Incorporated as the core layer of this invention, the stretching difficulties are minimized.

The multilayer film of the present invention is an oriented film that may be stretch oriented in one or more directions, preferably biaxially oriented by biaxial stretching in which the film is stretched in two directions which are preferably at 90° to one another.

It is important that the casings have at least about 15% and up to about 20% shrinkage in each of the MD and TD directions and to have sufficient shrink force to ensure good conformation of the casing to enclosed foodstuffs.

Biaxial orientation by biaxial stretching increases the tensile strength of films and decreases the percentage of elongation at break. Advantageously, the multilayer films of the present invention exhibit excellent mechanical strength.

General equipment and procedures similar to those described in U.S. Pat. No. 3,456,044 (Pahlke), may be employed in the present invention as modified as disclosed herein. Other orientation and stretching apparatus to uniaxially or biaxially stretch film are known in the art and may be adapted by those skilled in the art to produce films of the present invention. Examples of such apparatus and processes are believed to include e.g. those disclosed in U.S. Pat. Nos. 3,278,663; 3,337,665; 4,590,106; 4,760,116; 4,769,421; 4,797,235; and 4,886,634.

The inventive film may be made using a method for biaxially orienting thermoplastic films, in which a primary tube is formed by melt extruding a tube from an annular die. The primary tube can be made by any of the known techniques for extrusion of tubular plastic film including coextrusion and coating lamination methods. This extruded tube is cooled, collapsed, and then inflated between first and second means for blocking the interior of the tube which means are set apart from one another to form an isolated fluidic mass or bubble, and the inflated tube is advanced through a heating zone to bring the tube to its draw temperature. In a draw or orientation zone the tubing is radially expanded in the transverse direction and pulled or stretched in the machine direction at a temperature such that expansion occurs in both directions (preferably simultaneously)—the expansion of the tubing being accompanied by a sharp, sudden reduction of thickness at the draw point. The term heating zone is used to define a region which includes both a zone of preliminary heating of the primary tubing to the draw temperature and also the draw or orientation zone.

In the present invention the tubing may be biaxially stretched by passing the tubing through a heating zone and rapidly radially extending the tubing when the tubing is at the draw temperature. The extended tubing is contacted with a stream of cooling fluid, while extended in the heating zone, and the temperature of the cooling fluid at least at one point within the heating zone, is substantially below the temperature to which the tubing has been heated during its flow through the heating zone up to said at least at one point within said heating zone. The temperature of the cooling fluid in the draw zone is at least 10° F. (5° C.) below that of the tubing at the draw point. Preferably the cooling fluid is air, and a stream of high velocity air is blown in a generally upward direction, toward the radially extended portion of the tubing.

Alternatively, film of the present invention may be made by sheet extrusion or lamination with orientation e.g. by tentering. Tubes may be made from sheets of film by seaming using e.g. adhesives. In this manner various diameter tubes may be made from sheet film and tubular film may be slit and resized by seaming.

A preferred process of the present invention is a continuous process for making a tubular, biaxially stretched, heat shrinkable multilayer thermoplastic food casing. This process may comprise:

(a) coextruding a melt plasticized multilayer thermoplastic tube having an exterior surface and an interior surface through an annular die wherein the tube comprises an inner polyamide layer, an adhesive polyethylene layer, a core layer of EVOH, an adhesive polyethylene layer, and an outer polyamide layer;

(b) cooling the coextruded tube below the melting point of each layer by applying water to the exterior surface of the tube;

(c) transferring the cooled tube to an orientation zone wherein the tube is reheated to a temperature below the melting point of the tube layer with the lowest melting point, followed by cooling while a fluid mass is admitted to the interior of the tube as said tube is passed between first and second means for blocking fluid flow along the interior of the tube, thereby causing the tube to stretch circumferentially about the entrapped fluid mass and simultaneous with the circumferential stretching, the tube is stretched in a direction perpendicular thereto to produce a biaxially stretched tubular film; and (d) annealing the biaxially stretched film at elevated temperature to dimensionally stabilize the film.

The following are examples and comparative examples given to illustrate the present invention.

Experimental results of the following examples are based on tests similar to the following test methods unless noted otherwise.

Tensile Strength: ASTM D-882, method A

% Elongation: ASTM D-882. method A

1% Secant Modulus: ASTM D-882, method A

Oxygen Gas Transmission Rate (O$_2$GTR): ASTM D-3985-81

Gauge: ASTM D-2103

Shrinkage Values: Shrinkage values are defined to be values obtained by measuring unrestrained shrink at 90° C. for five seconds. Four test specimens are cut from a given sample of the film to be tested. The specimens are cut into squares of 10 cm length in the machine direction by 10 cm. length in the transverse direction. Each specimen is completely immersed for 5 seconds in a 90° C. water bath. The specimen is then removed from the water bath and the distance between the ends of the shrunken specimen is measured for both the MD and TD directions. The difference in the measured distance for the shrunken specimen and the original 10 cm. side is multiplied by ten to obtain the percent of shrinkage for the specimen in each direction. The shrinkage for the four specimens is averaged for the MD shrinkage value of the given film sample, and the shrinkage for the four specimens is averaged for the TD shrinkage value.

In all the following examples, unless otherwise indicated herein the film compositions were produced generally utilizing the apparatus and method described in U.S. Pat. No. 3,456,044 (Pahlke), which describes a coextrusion type of double bubble method and in further accordance with the detailed description above. All percentages are by weight unless indicated otherwise.

EXAMPLE 1

One extruder was used for each layer, and the heat lasticized resins from each extruder were introduced to a coextrusion die from which the resins were coextruded at an inner:adhesive:core:adhesive:outer layer ratio of about 10:17.5:5:17.5:50.

The inner layer resin was Nylon 6 homopolymer from UBE Industries, Ltd. The adhesive blend consisted of 30% by weight of Bynel 4140 (a LLDPE based adhesive concentrate from E.I. DuPont de Nemours and Company) and 70% by weight Exxon EVA 712.06 (10% by weight EVA, 0.35 MI). The core layer was BVAL H101BD (EVOH, 38% by weight ethylene) from Eval Company of America. The outer layer was Nylon 6,66, the 5033 FDX27 resin from UBE Industries, Ltd.

The resin or resin mixture was fed from a hopper into an attached single screw extruder where the resin was heat plasticized and extruded through a five-layer coextrusion spiral die into a primary tube. Die temperatures were set at 250° C. The extruder multilayer primary tube was cooled by spraying with water at a temperature of 5° C. A primary tube with a diameter of 44 mm was flattened by passage through a pair of nip rollers.

The primary tube was then reheated in a hot water bath maintained at 85° C. and biaxially stretched by a factor of 2.5 in the longitudinal direction and 3.65 in the transverse direction using a trapped bubble with airtight seal.

In a sequential step, the oriented film was annealed at a temperature of 120° C. by allowing the film to relax from 257 mm to 217 mm in the transverse direction (15.8%) and 8% in the longitudinal direction. A final film of 217 mm was wound on a core. The film had 20%/22% MD/TD shrink, measured at 90° C. The film thickness was approximately 45 mm.

Properties of the film are listed in Table I.

TABLE 1

| Properties of Inventive Film | |
|---|---|
| Gauge, mils | 1.8 |
| Tensile Strength, PSI | MD = 17,360 |
|  | TD = 24,740 |
| Elongation @ Break, % | MD = 139 |
|  | TD = 109 |
| 1% Secant Modulus, PSI | MD = 77,620 |
|  | TD = 79,670 |
| % Shrinkage @ 90° C. | MD = 20% |
|  | TD = 22% |
| O$_2$ Transmission, cc/100 in$^2$/24 hours | 0.25 |

The film was then tested for a ham in mold application. Hams were hand stuffed into the film using the TIPPER Press Tie. The hams were then water cooled to an internal temperature of 160° F. After processing and chilling, the hams were inspected for appearance. The hams were considered to be of commercial quality. There were no wrinkles; corners were square and not rounded, and the hams exited easily from the mold. No purge was noted and the film peeled easily from the ham product.

EXAMPLE 2

Using the same process as in Example 1, the following two casings were made.

Casing 1 had an inner: adhesive blend: core: adhesive blend:outer layer ratio of about 15:15:5:15:50. The inner layer resin was nylon 6 homopolymer resin from UBE Industries, Ltd. The adhesive blend consisted of 10 % Bynel CXR 41E710 (metallocene LLDPE based adhesive concentrate from DuPont) and 90% EXXON EVA 712.06 (10% vinyl acetate, 0.35 MI). The core layer was EVAL H101BD (EVOH with 38% ethylene) from Eval Company of America and the outer layer was nylon 6,66, 5033FDx27 resin from UBE Industries, Ltd. The casing was biaxially stretched by a factor of 2.5 in the longitudinal direction and 3.55 in the transverse direction. The oriented film was annealed at a temperature of 130° C. by allowing the film to relax from 240 mm to 200 mm in the transverse direction (16.6%) and 5% in the longitudinal direction. A final film of 200 mm was wound on a core.

Casing 2 had an inner: adhesive: core: adhesive:outer layer ratio of about 15:15:5:15:50. The inner layer resin was nylon 6 homopolymer resin from UBE Industries, Ltd. The adhesive layer consisted of Admer QF551E from Mitsui Chemical (polypropylene based adhesive). The core layer was EVAL H101BD (38% ethylene) from Eval Company of America and the outer layer was nylon 6,66, 5033FDx27 resin from UBE Industries, Ltd.

The casing was biaxially stretched by a factor of 2.5 in the longitudinal direction and 3.55 in the transverse direction. The oriented film was annealed at a temperature of 130° C. by allowing the film to relax from 240 mm to 210 mm in the transverse direction (12.5%) and 5% in the longitudinal direction. The final tubular film of 210 mm was wound on a core.

In order to test a "D" shaped package, the tubular film was loosely filled or "slack filled" with a ham and turkey loaf product. One measure of "D" shape performance is the change in package height after cooking. An acceptable "D" shape product has a 10–18% increase in height from the pre-cooked, or "green", height. Products tending to be unacceptable and too oval in shape have a height increase of from about 22% to about 30%. The height of the package is measured in inches. Additionally, an acceptable rate of gas transmission for oxygen is less that about 0.6 cc/100 inches$^2$/24 hours.

Table II shows the results of testing on the "D" shaped ham and turkey loaf product.

TABLE II

"D" SHAPED FILM/TEST RESULTS

| Sample: | Film #1 | Film #2 |
|---|---|---|
| Product | Ham and turkey loaf | Ham and turkey loaf |
| Adhesive: | 10% by weight Byner 41E710 90% by weight Exxon EVA 712.06 | 100% Admer QF551E |
| Annealing | 16.6% | 12.5% |
| Green height | 3.83 | 3.78 |
| Cooked height | 4.41 | 4.88 |
| % Change | 14.9 | 30.1 |
| Tensile strength, PSI | MD = 18,540 TD = 24,666 | MD = 19,190 TD = 25,770 |
| 1% Secant Modulus, PSI | MD = 245,900 TD = 255,300 | MD = 283,700 TD = 280,600 |
| % Shrink @ 90° C. | MD = 17 TD = 18 | MD = 10 TD = 17 |
| % Elongation | MD = 124% TD = 103% | MD = 125% TD = 93 |
| Rating | Acceptable | Not acceptable |

Casing of Film #1 made with an adhesive blend of LLDPE and EVA with 16.6% annealing performed well. Casing of Film #2 made with a polypropylene adhesive and with 12.5% annealing performed poorly in a "D" shaped test.

Further modification of the invention disclosed will be apparent to those skilled in the art and all such modification are deemed to be within the scope of the invention as defined by the following claims.

What is claimed is:

1. A tubular, biaxially stretched, heat shrinkable, multilayer film, food casing comprising:
   (a) from at least about 8% to about 15% by weight of the total weight of the casing, an inner layer comprising a polyamide that is meat-adhering;
   (b) from at least about 15% to about 20% by weight of the total weight of the casing, an inner adhesive layer adjacent to said inner layer, comprising a LLDPE or blend of LLDPE and EVA;
   (c) from at least about 3% to about 5% by weight of the total weight of the casing, a core layer adjacent to said inner adhesive layer comprising EVOH;
   (d) from at least about 15% to about 20% by weight of the total weight of the casing, an outer adhesive layer adjacent to said core layer, comprising a LLDPE or blend of LLDPE and EVA; and
   (e) from at least about 45% to about 55% by weight of the total weight of the casing, an outer layer comprising a copolyamide;
   wherein said multilayer film has a shrinkage value of at least 15% in both the transverse direction and the machine direction at 90° C.

2. A casing, as defined in claim 1, wherein said film has a shrinkage value of at least 15% to about 20% at 90° C.

3. A casing, as defined in claim 1, wherein said layers (a), (b), (c), (d) and (e) are coextruded.

4. A casing, as defined in claim 1, wherein said multilayer film has a thickness of between about 40 to about 60 microns.

5. A casing, as defined in claim 1, wherein said inner layer (a) comprises nylon 6.

6. A casing, as defined in claim 1, wherein said outer layer (e) comprises nylon 6/66.

7. A casing as defined in claim 1, wherein said inner adhesive layer and said outer adhesive layer are comprised of a maleic anhydride grafted LLDPE.

8. An encased foodstuff comprising a heat processed fat containing and protein containing foodstuff encased in a tubular, biaxially stretched, heat shrinkable, multilayer film, food casing comprising:
   (a) from at least about 8% to about 15% by weight of the total weight of the casing, an inner layer comprising a polyamide that is meat-adhering;
   (b) from at least about 15% to about 20% by weight of the total weight of the casing, an inner adhesive layer adjacent to said inner layer, comprising a LLDPE or blend of LLDPE and EVA;
   (c) from at least about 3% to about 5% by weight of the total weight of the casing, a core layer adjacent to said inner adhesive layer comprising EVOH;
   (d) from at least about 15% to about 20% by weight of the total weight of the casing, an outer adhesive layer adjacent to said core layer, comprising a LLDPE or blend of LLDPE and EVA; and
   (e) from at least about 45% to about 55% by weight of the total weight of the casing, an outer layer comprising a copolyamide;
   wherein said multilayer film has a shrinkage value of at least 15% in both the transverse direction and the machine direction at 90° C., wherein said foodstuff is in direct contact with said inner layer (a) and adheres thereto.

* * * * *